UNITED STATES PATENT OFFICE.

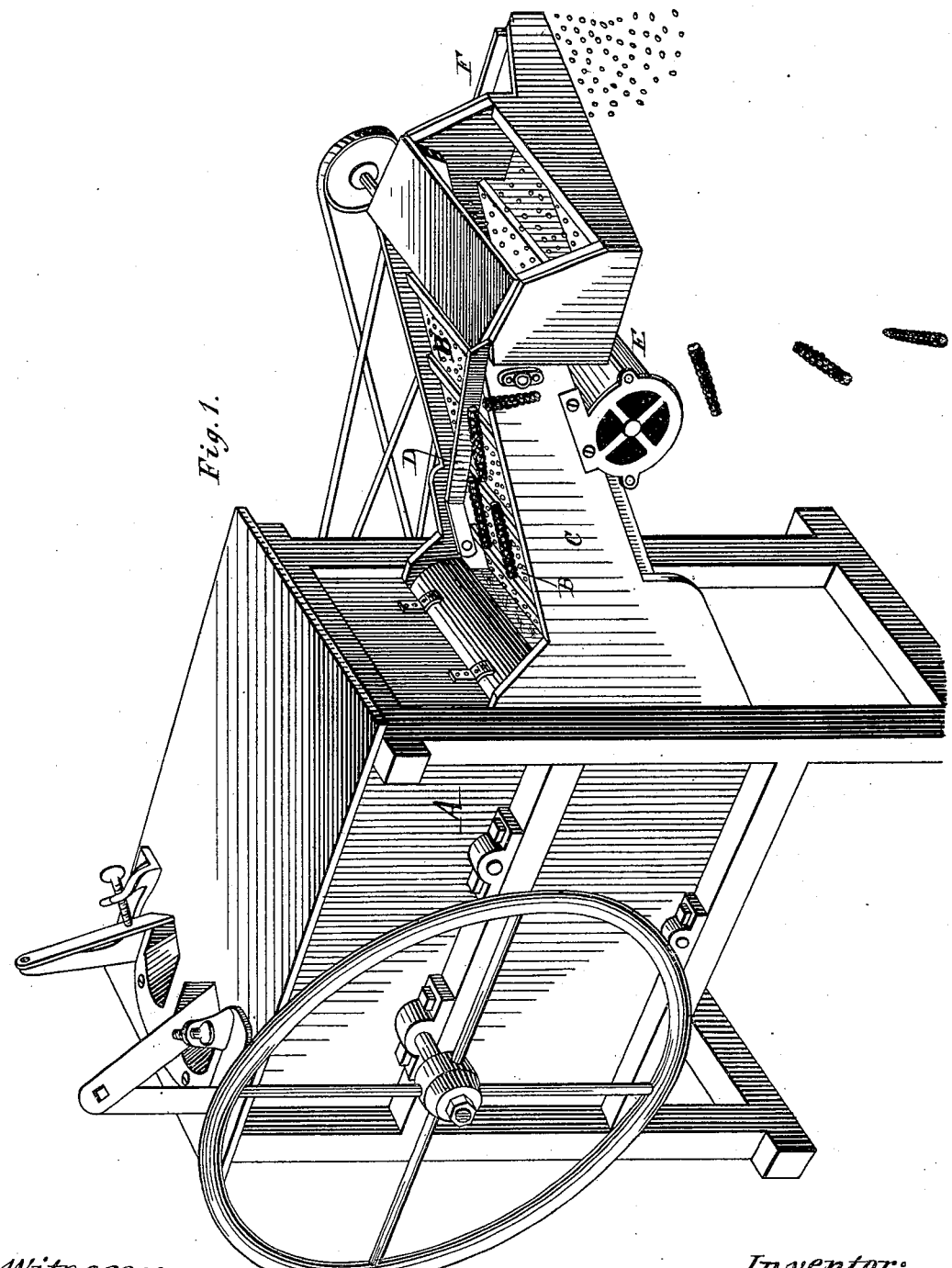

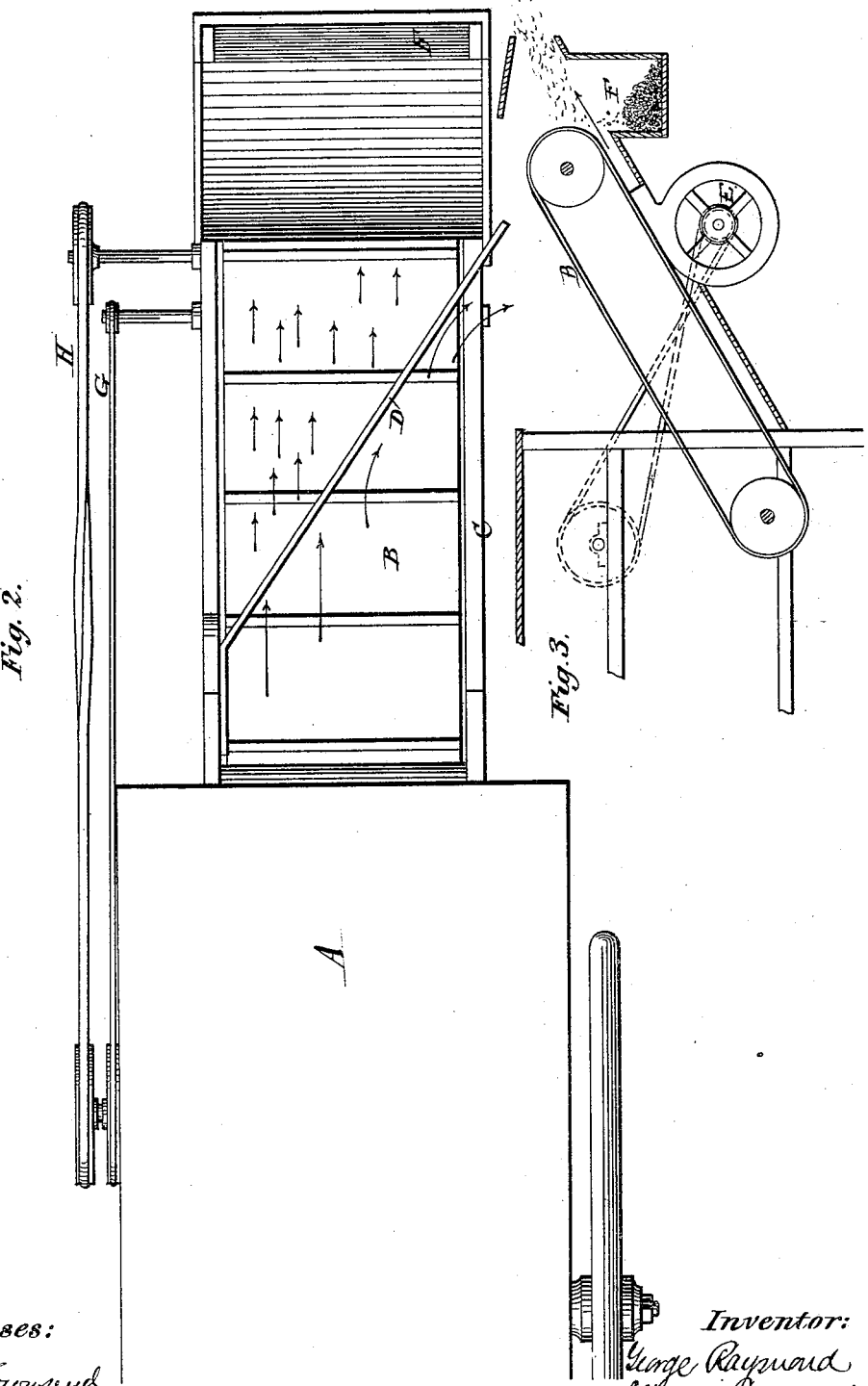

GEORGE RAYMOND AND ALBERT RAYMOND, OF WAUPUN, WISCONSIN.

CORN-SHELLING MACHINE.

SPECIFICATION forming part of Letters Patent No. 248,349, dated October 18, 1881.

Application filed March 10, 1881. (No model.)

*To all whom it may concern:*

Be it known that we, GEORGE RAYMOND and ALBERT RAYMOND, of Waupun, in the county of Fond du Lac and State of Wisconsin, have invented certain Improvements in Corn-Shelling Machines, of which the following is a specification.

Our invention relates to means for separating the shelled corn from the cobs and for removing all light foreign matters from the corn.

The first part of the invention consists in the combination of an apron or belt upon which the cobs and corn are carried from the shelling devices with an oblique bar or arm arranged in the peculiar manner above the belt to arrest the cobs and deliver them at one side of the machine, while permitting the kernels of corn to pass beneath to a delivery-spout or other receiving device.

The second part of the invention consists in combining with the carrier-apron above described a blast-fan located thereunder, as hereinafter described in detail.

Referring to the accompanying drawings, Figure 1 represents a perspective view of a corn-shelling machine provided with our improvements. Fig. 2 is a top-plan view of the same. Fig. 3 is a longitudinal vertical section through one end of the sheller with our devices attached thereto.

A represents the frame or body of a corn-shelling machine of any ordinary or suitable construction, the shelling devices or devices by which the corn is removed from the cob constituting no part of our invention.

B represents an endless carrier belt or apron extending upward and outward from the rear end of the machine, and sustained at its two ends by rollers sustained in suitable supports, the outer roller being in the present instance supported by a supplemental frame, C, attached to the main frame of the sheller. The carrier-apron B is arranged in such position that its lower end will receive the corn and cobs within the body of the sheller and pass them outward and upward therefrom. The surface of the belt is provided, as shown, with a series of transverse slats or bars to enable it the better to take hold of and carry the corn and the cobs. The escape of the corn at the edges of the belt is prevented by the raised sides of the frame.

D represents the bar for delivering the cobs at the side of the machine, constituting one of the leading features of our invention. This bar is pivoted at its lower end to one side of the belt-sustaining frame, and extends thence upward diagonally across and above the belt and over the opposite edge of the frame, the lower edge of the bar lying at such distance from the surface of the apron as to arrest the ears of corn in their upward movement to permit the kernels of corn to pass beneath and continue their course over the upper end of the belt. The bar D is free to rise and fall at its upper end by gravity, and is preferably made of elastic material, that it may yield laterally under the pressure of the cobs, in order to relieve the parts from undue strain.

Beneath the upper end of the carrier-belt we arrange a transverse inclined trough, F, for the purpose of receiving the shelled corn from the belt and delivering it at the side of the machine. Beneath the belt, near its upper end, we mount a transverse blower-fan, E, for the purpose of producing a blast of air to act upon the corn and drive the chaff and other light impurities therefrom before it is delivered into the spout. The location of this fan and the course of the air-current produced thereby will be readily understood on reference to Figs. 1 and 3, the arrows in the latter figure indicating the course of the air-blast.

Motion may be imparted to the endless carrier and the fan by any suitable means; but it is preferred to drive them by means of belts G and H, extending from pulleys on the shellers to pulleys on the ends of the upper belt-carrying roll and the blower-shaft, respectively.

By our construction and arrangement of the parts we produce a machine which is at once cheap, simple, and durable, and which effects a perfect separation of the corn from the cobs and light impurities. While it is not absolutely necessary that the delivery-belt should be inclined, as shown, it is found that the delivery of the cobs is greatly facilitated thereby.

We are aware that a machine has been described in which cobs were to be carried against a device which would arrest their movement while permitting the kernels of corn to pass forward, the construction and arrangement of parts, however, being essentially different from that herein described.

What we claim as our invention is—

1. In a corn-sheller, the combination of an endless carrier-apron, upon which the cobs and shelled corn are received, and a bar arranged diagonally above the apron at such distance as to permit the kernels to pass beneath but arrest the cobs and deliver them at the side.

2. In combination with the carrier-apron, the gravitating-bar D, arranged obliquely across the same.

3. In combination with an endless carrier-apron, upon which the cobs and shelled corn are received, an elastic or yielding bar extending obliquely across said apron at such distance above the same as to permit the passage of the shelled corn upon the apron beneath the bar.

4. In combination with the endless delivery-apron B, connected with a corn-sheller, the oblique elastic bar D, mounted at one end upon a pivot, substantially as shown.

5. In combination with a shelling-machine, a slatted endless belt, having an upward inclination toward its delivery end and a fixed delivery bar or guard extending obliquely across and a small distance above the surface of the said belt, as described and shown.

6. In combination with a corn-sheller, the delivery-belt and the oblique cob-discharging bar fixed at such distance above the apron as to permit the passage of the shelled corn, but not the cobs, between said belt and bar.

7. In combination with the corn-shelling machine, the endless apron, the delivery-bar to remove the cobs, but permit the passage of the kernels, and the fan arranged to direct a blast of air through the kernels as they fall from the apron.

GEORGE RAYMOND.
ALBERT RAYMOND.

Witnesses:
FREDERICK C. GOODWIN,
WALTER C. LARNED.